United States Patent
Ellis et al.

[11] Patent Number: 5,865,582
[45] Date of Patent: *Feb. 2, 1999

[54] ONE-DIRECTION CAPTIVE SCREW FASTENER

[75] Inventors: Thomas J. Ellis, Wilmington, Del.; Harry L. Dickerson, Newtowon Square, Pa.

[73] Assignee: Southco, Inc., Concordville, Pa.

[*] Notice: The term of this patent shall not extend beyond the expiration date of Pat. No. 5,642,972.

[21] Appl. No.: 811,872

[22] Filed: Mar. 5, 1997

Related U.S. Application Data

[63] Continuation of Ser. No. 554,563, Nov. 6, 1995, Pat. No. 5,642,972.

[51] Int. Cl.[6] ............................................. F16B 21/18
[52] U.S. Cl. ........................ 411/353; 411/352; 411/970; 411/999
[58] Field of Search ............................. 411/352, 353, 411/970, 999, 402, 408, 410, 919

[56] References Cited

U.S. PATENT DOCUMENTS

| | | | |
|---|---|---|---|
| 1,188,420 | 6/1916 | Eadie . | |
| 2,006,359 | 7/1935 | Lackner | 151/39 |
| 3,126,935 | 3/1964 | Tuozzo | 151/69 |
| 3,250,559 | 5/1966 | Sommerfeld | 292/251 |
| 3,385,341 | 5/1968 | Garstkiewicz | 151/39 |
| 3,564,563 | 2/1971 | Trotter | 24/221 |
| 4,235,269 | 11/1980 | Kraus | 81/438 |
| 4,602,903 | 7/1986 | Wilburn | 411/222 |
| 4,692,075 | 9/1987 | Metz | 411/7 |
| 4,696,208 | 9/1987 | Lay | 81/58 |
| 4,964,773 | 10/1990 | Schmidt | 411/373 |
| 5,069,091 | 12/1991 | Bramsiepe et al. | 81/177 |
| 5,336,028 | 8/1994 | Yamamoto | 411/107 |
| 5,338,139 | 8/1994 | Swanstrom | 411/353 |
| 5,382,124 | 1/1995 | Frattarola | 411/352 |
| 5,544,992 | 8/1996 | Ciobanu et al. | 411/353 |
| 5,642,972 | 7/1997 | Ellis et al. | 411/352 |

OTHER PUBLICATIONS

Southco Latches and Access hardware Handbook 45 NA, pp. B19–B22 & C1–C44.

*Primary Examiner*—Brian K. Green
*Assistant Examiner*—Frederick Conley
*Attorney, Agent, or Firm*—Paul & Paul

[57] ABSTRACT

A one-directional captive screw attachable to a panel that is hand tightenable, but requires a tool to loosen once hand tightened. The captive screw includes a screw having a head with a recess and a threaded portion, a knob having a central longitudinal axis coaxial with the screw, a one-directional ratchet between the knob and the screw. The ratchet engages to allow the screw to be tightened in a clockwise direction using the knob, and disengages when rotated in a counterclockwise direction, such that a tool is required to loosen the screw by use of the recess.

5 Claims, 2 Drawing Sheets

ONE-DIRECTION CAPTIVE SCREW FASTENER

This application is a continuation of application Ser. No. 08/554,563, filed Nov. 6, 1995 and now a U.S. Pat. No. 5,642,972.

BACKGROUND OF THE INVENTION

This invention relates to captive screws of the type generally used to attach an upper panel to a lower panel or frame wherein it is desired to keep the fastener in position without loose items of hardware. The captive screw is mounted on the upper panel, such that the screw stays attached to the panel even when the threads of the screw shaft are fully disengaged from a second panel to which the upper panel is attached. The present invention is particularly useful in the electronics industry. In certain applications, when doors or covers are opened or removed and a hazardous voltage exists behind these doors or covers, it is often required or desirable that the door or cover be opened or removed by using a tool. Regulations in the United States often merely require a simple screw driver. In Europe however, a Phillips driver or other tool often must be used. The present invention has the unique ability to provide for hand tightening when closing the door or panel, but requires a tool, such as a screw driver to effect removal.

SUMMARY OF THE INVENTION

The present invention relates to a retractable captive screw as is known in the art of the type wherein a door or cover or other thin, flat surface is to be mounted against another surface such as a panel or frame. Unlike retractable captive screws designs as are known in the art, see e.g. U.S. Pat. No. 5,382,124 to Frattarola, the specification of which is herein incorporated by reference, the present invention allows normal finger pressure or tool tightening torque in the clockwise direction, but when rotating the knob in the counterclockwise direction, only the knob turns; the screw remains torqued down. The action is accomplished by means of a "C"-shaped spring which acts as a driver to transmit torque from the knob to a flange on the screw in the tightening mode, while deflecting inwardly, thus disengaging the driving action, when the knob is rotated counterclockwise.

The one-directional captive screw is attachable to a panel, is hand tightenable, but requires a tool to loosen once hand tightened. The captive screw comprises a screw having a head with a recess means to facilitate rotation and a threaded portion, a knob having a central longitudinal axis coaxial with the screw, and a one-directional ratchet means disposed between the knob and the screw. The ratchet means engages to allow the screw to be tightened in a clockwise direction using the knob, and disengages when rotated in a counterclockwise direction, such that a tool is required to loosen the screw by use of the recess means. The one-directional captive screw further comprises a ferrule having a panel attachment means at one for attaching the captive screw to a panel, and a knob captivation means for attaching said knob to said ferrule but, allowing for rotation of the knob and limited axial movement of said knob with respect to said ferrule to a allow the screw threads to engage the panel to which the door or cover attaches.

It is therefore an object of the present invention to provide a new and improved captive screw.

It is another object of the present invention to provide a new and improved captive screw that may be hand tightened, but requires a tool to loosen once tightened.

It is another object of the present invention to provide a new and improved captive screw that may be hand tightened, but requires a tool to loosen once tightened that is reliable and simple to manufacture.

It is another object of the present invention to provide a new and improved captive screw that may be hand tightened, but requires a tool to loosen once tightened that complies with government regulations regarding high voltages.

It is another object of the present invention to provide a new and improved captive screw that may be hand tightened or tightened with a tool, but requires a tool to loosen once tightened.

Other objects and advantages of the present invention will become apparent from the following description taken in conjunction with the accompanying drawings.

DESCRIPTION OF THE PREFERRED EMBODIMENT

Figures 1, 2:
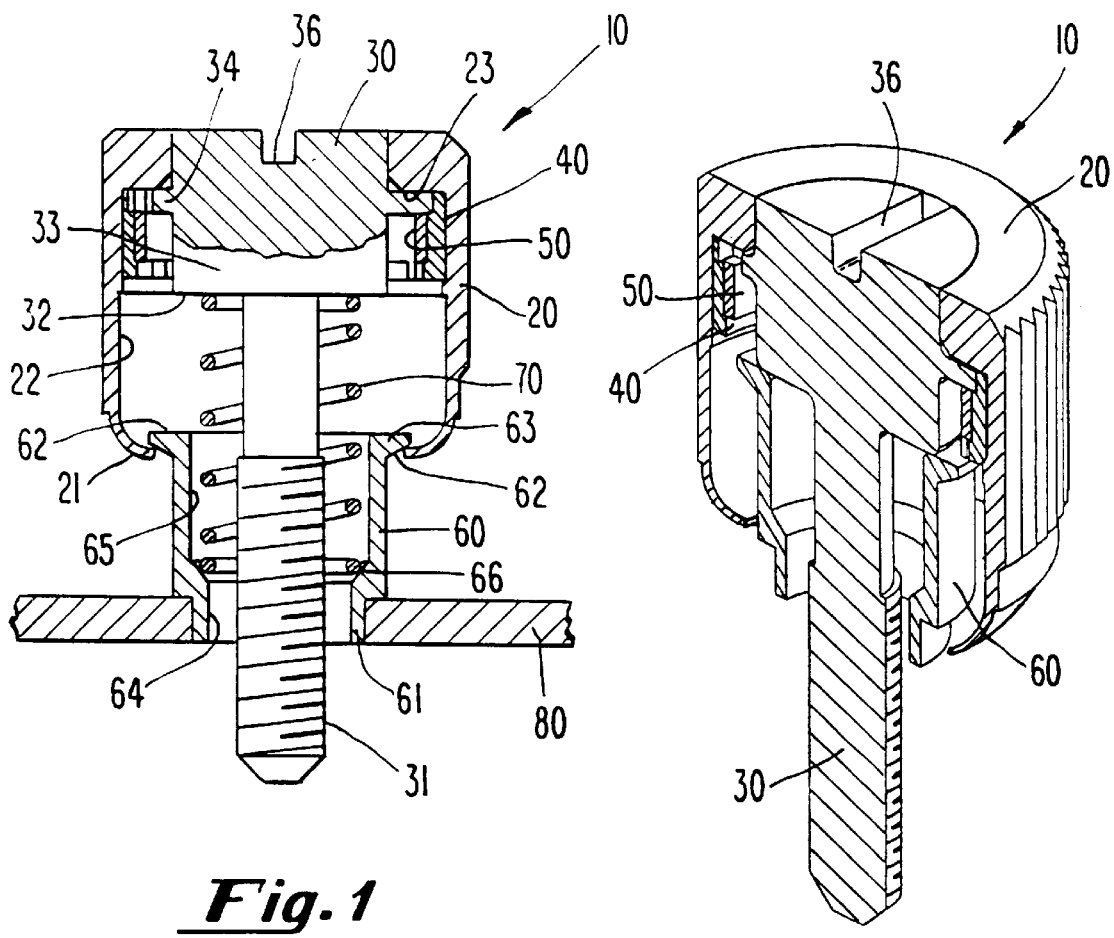
FIG. 1 is a cutaway elevational view of a one-directional captive screw in accordance with one embodiment of the present invention shown as mounted on a panel, depicted in a fully disengaged position.
FIG. 2 is a cutaway perspective view of the captive nut of the embodiment of FIG. 1 depicted in a fully engaged position shown without a spring and not mounted on a panel.

Referring now in detail to the drawings, wherein like reference numerals indicate like elements throughout the several views, there is shown in FIGS. 1 and 2, a one-directional captive screw 10 in accordance with one preferred embodiment of the present invention. The illustrative device is shown generally comprising a knob 20, a screw 30, a ratchet wheel 40, a C-spring 50, a ferrule 60 having a panel mounting means 61, and a spring 70. FIG. 1 depicts the captive screw of the present invention as attached to a panel 80.

Screw 30 is rotationally disposed within knob 20 as depicted in FIGS. 1 and 2. Knob 20 is substantially hollow, but has an inwardly extending annular flange 23 that, in combination with an outwardly extending annular flange 34 on screw 30, provides a stop that allows for rotation along the axis of the screw 30. Displacement of the screw in the opposite axial direction is prevented by ratchet wheel 40 and C-spring 50. Ratchet wheel 40 has axial knurled teeth 41 on its outer surface, and is preferably constructed of a harder material than that of the knob to allow for the ratchet wheel 40 to be pressed rigidly into position in knob 20. However, ratchet teeth could also be formed integral to the knob 20. In constructing the one-directional captive screw 10 of the present invention, the screw head 33 end of screw 30 is inserted into knob 20, and then the C-spring 50 together with ratchet wheel 40 are positioned to hold screw 30 axially in position in knob 20, allowing for substantially no axial movement of the screw 30 within knob 20, but allowing for rotational movement of the screw 30.

Figure 3:
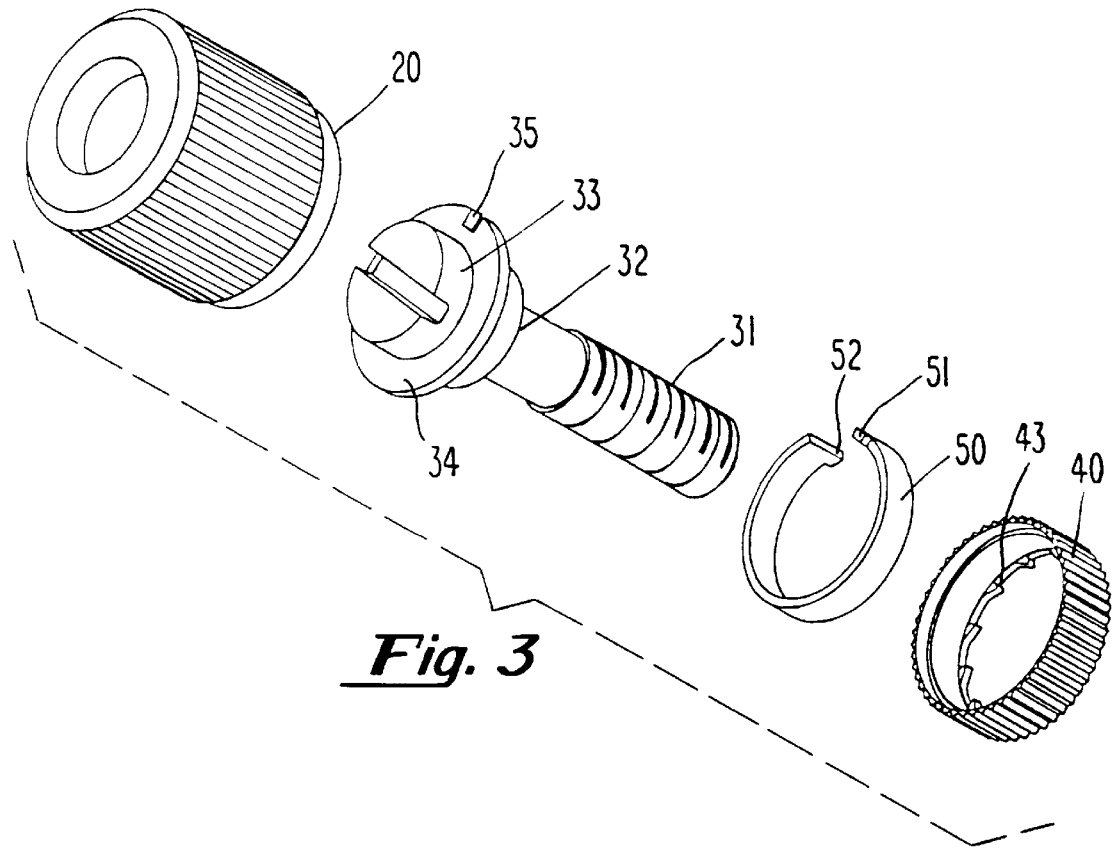
FIG. 3 is an exploded perspective view of a knob, screw, C-spring, and ratchet wheel of the embodiment of FIG. 1,.
Figure 4:
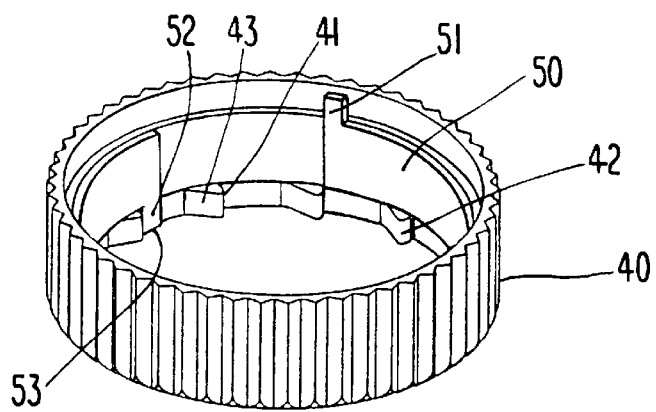
FIG. 4 is a perspective view depicting the inter-relationship of the C-spring and ratchet wheel of FIG. 3.

As is clearly depicted in FIG. 4, C-spring 50 has an upwardly extending tab 51 which mates with notch 35 in screw 30 (see FIG. 3) and also has a downwardly extending pawl 52 which engages with ratchet wheel 40. When knob 20 is rotated in the clockwise direction, torque is transmitted through to ratchet wheel 40, which, as described above, is assembled integral to knob 20. A front face 42 of one of the plurality of teeth 41 on ratchet wheel 40 engages with the front face 53 of pawl 52 on C-spring 50. Torque is transmitted through C-spring 50 to tab 51 in C-spring 50, which is always engaged in notch 35 of screw 30 (see FIG. 3). Thus, torque, applied by fingers of an operator is transmitted from knob 20 to the ratchet wheel 40 to the C-spring 50 to the screw 30. However, when knob 20 is rotated in the counter-clockwise direction, pawl 52 on C-spring 50 deflects generally radially inwardly, caused by the angled side 43 of ratchet teeth 41, disengaging the driving action. The C-spring 50 is located between the driving teeth 41 of ratchet wheel 40 (underneath the C-spring) and the annular flange 34 on screw 30.

Thus, when the knob 20 is turned in the counter-clockwise direction, after the captive screw 10 has been torqued down tightly by finger pressure in the clockwise direction, the knob 20 rotates generally freely in the counterclockwise direction, with the exception of minor frictional forces due to the outward force by C-ring 50 on ratchet wheel 40. If the screw 10 has not yet been torqued down, these frictional forces may allow for the knob to turn the screw 30 in the counter-clockwise direction, however, this is not consequential for the present invention. In order to loosen the screw 30, a screw driver or other appropriate tool must be used with the screw recess 36. The recess 36 may also be used to tighten the screw 30, if desired.

As can be seen in FIGS. 1 and 2, knob 20 is attached to ferrule 60, however, full rotational movement of the knob 20 with respect to the ferrule 60, and a limited amount of axial movement of the knob 20 with respect to the ferrule 60, corresponding to screw engagement length, are provided. The limited axial movement is accomplished by a first annular flange 21 on the knob 20 extending inwardly from the inner surface 22 of the hollow knob 20 towards the threaded shaft 31 of screw 30, in combination with a second annular flange 62, integral to the ferrule 60 extending outwardly from the body of the ferrule 60 at the knob end or first end of the ferrule 60. The inner surface 21 of the hollow knob 20 has a larger diameter than the outside diameter of the ferrule annular flange 62 such that a portion of the ferrule 60 is slidable within the hollow cylindrical body of knob 20. When the captive screw 10 is engaged, i.e. when two panels are rigidly connected by the captive screw 10, the upper surface of the ferrule 63 is fully inserted into the hollow cylindrical body of the knob 20. This position is depicted in FIG. 2 which omits the panel to which the ferrule 60 is attached. Note that in the fully inserted position, the bottom surface 32 of the screw head 33 is pressing down on the upper surface 63 of the ferrule 60. The first and second annular flanges 21 and 62 allow the knob 20 and the ferrule 60 to be a single non-detachable assembly, while allowing for axial movement of the knob 20 with respect to the ferrule 60.

Preferably, encased between the ferrule 60 and the knob 20 is a spring 70. Ferrule 60 has a two stage internal diameter: a lower internal diameter 64 and an upper internal diameter 65. The lower internal diameter 64 allows only clearance for threaded shaft 31 of screw 30 while the upper internal diameter 65 has an internal diameter large enough to accommodate the threaded shaft 31 with spring 70 surrounding it. The step 66 created with the two different internal diameters 64, 65 serves to function as a termination point for one end of spring 70. The opposite end of spring 70 is terminated at the bottom surface 32 of screw 30. When the spring 70 is in its most uncompressed position, the knob 20 is at its most retracted position, i.e. the annular flanges 21 and 62 are in contact with each other.

The desired action can also be accomplished by using the opposite configuration of that as described above. In this embodiment, the C-spring is coupled directly to the knob rather than the screw. The screw has an integral toothed ratchet flange (i.e. a ratchet wheel) and thus the same action as the first embodiment is achieved.

Any method of mounting the ferrule 60 to a panel, as known in the art, may be used. This may include a snap-in panel attachment means (described in U.S. Pat. No. 5,382,124), press-in panel attachment means, flare-in panel attachment means, and the like.

Additionally, the screw head may have a slotted recess, a Phillips recess, a hex recess, or any other known type of recess in the art, including any type of special keyed recess to provide a locking mechanism.

It will be recognized by those skilled in the art that changes may be made in the above described embodiments of the invention without departing from the broad inventive concepts thereof. It is understood, therefore, that this invention is not limited to the particular embodiments disclosed, but is intended to cover all modifications which are within the scope and spirit of the invention as defined by the appended claims.

We claim:

1. A captive fastener attachable to a panel, to secure said panel to a second panel, that is hand tightenable to secure said panels to one another, but requires a tool to loosen said panels from one another once hand tightened, comprising:
    (a) a screw comprising:
        (i) a head with a recess means to facilitate rotation;
        (ii) a threaded portion;
    (b) a knob having a central longitudinal axis coaxial with said screw, said screw rotatingly disposed within said knob in a counterclockwise direction, and rigidly disposed within said knob in a counterclockwise direction; and
    (c) a one-directional ratchet means disposed between said knob and said screw that engages to allow said screw to be tightened in a clockwise direction using said knob, and disengages when rotated in a counterclockwise direction, such that a tool is required to loosen said screw using said recess means.

2. The captive fastener of claim 1, including a ferrule, having two ends, said ferrule having a panel attachment means at one end for attaching the captive fastener to the panel and a knob captivation means for attaching said knob to said ferrule and allowing for rotation of the knob and limited axial movement of said knob with respect to said ferrule.

3. The captive fastener of claim 2, including a spring located between said ferrule and said knob to bias said knob and said ferrule apart to the limit of the axial movement of the knob with respect to the ferrule when the threaded portion of the screw is not engaged.

4. A captive fastener attachable to a panel, to secure said panel to a second panel, that is hand tightenable to secure said panels to one another, but requires a tool to loosen said panels from one another once hand tightened, comprising:
    (a) a screw comprising:
        (i) a head with a recess means to facilitate rotation;
        (ii) a threaded portion;
    (b) a knob having a central longitudinal axis coaxial with said screw, said screw rotatingly disposed within said knob in a counterclockwise direction, and rigidly disposed within said knob in a counterclockwise direction, (c) a one-directional ratchet means disposed between said knob and said screw that engages to allow said screw to be tightened in a clockwise direction using said knob, and disengages when rotated in a counterclockwise direction, such that a tool is required to loosen said screw using said recess means;

(d) a ferrule, having two ends, said ferrule having a panel attachment means at one end for attaching the captive fastener to a panel; and (e) a knob captivation means for attaching said knob to said ferrule and, allowing for rotation of the knob and limited axial movement of said knob with respect to said ferrule.

5. The captive fastener of claim 4, including a spring located between said ferrule and said knob to bias said knob and said ferrule apart to the limit of the axial movement of the knob with respect to the ferrule when the threaded portion of the screw is not engaged.

* * * * *